United States Patent [19]

Kono

[11] Patent Number: 4,722,429

[45] Date of Patent: Feb. 2, 1988

[54] APPARATUS FOR CONTROLLING A FRICTION CLUTCH

[75] Inventor: Hiromi Kono, Higashimatsuyama, Japan

[73] Assignee: Diesel Kiki Co., Ltd., Tokyo, Japan

[21] Appl. No.: 896,159

[22] Filed: Aug. 13, 1986

[30] Foreign Application Priority Data

Aug. 16, 1985 [JP] Japan .................. 60-125186[U]

[51] Int. Cl.$^4$ .............................................. B60K 41/02
[52] U.S. Cl. ............................... 192/0.033; 192/0.076; 192/103 R
[58] Field of Search ............. 192/0.033, 103 R, 0.076, 192/52, 103 F, 0.052; 364/424.1; 361/242, 243

[56] References Cited

U.S. PATENT DOCUMENTS

| | | | |
|---|---|---|---|
| 4,343,387 | 8/1982 | Hofbauer | 192/0.076 |
| 4,401,200 | 8/1983 | Heidemeyer et al. | 192/103 F X |
| 4,509,625 | 4/1985 | Tellert | 192/103 R X |
| 4,518,068 | 5/1985 | Oguma et al. | 192/0.092 X |
| 4,529,072 | 7/1985 | Oguma et al. | 192/0.076 X |
| 4,615,425 | 10/1986 | Kobayashi et al. | 192/0.076 |

Primary Examiner—Rodney H. Bonck
Attorney, Agent, or Firm—Pollock, Vande Sande & Priddy

[57] ABSTRACT

A friction clutch controlling apparatus for controlling a friction clutch by an actuator has a detector for detecting slip rate of the friction clutch, and the detector detects an initial slip rate of the friction clutch at the start of the engaging operation of the clutch in response to a signal for commanding the engagement of the clutch. The operation for engaging the friction clutch is carried out by the actuator in such a way that the slip rate decreases from the initial slip rate to zero in accordance with predetermined slip rate control characteristics.

4 Claims, 5 Drawing Figures

APPARATUS FOR CONTROLLING A FRICTION CLUTCH

BACKGROUND OF THE INVENTION

The present invention relates to an apparatus for controlling a friction clutch, which is capable of carrying out the engaging operation of a friction clutch with high efficiency.

There have been proposed various friction clutch controlling apparatuses which have an actuator connected to the friction clutch and are capable of engaging/disengaging the friction clutch in response to an electric signal provided from outside. This type of clutch controlling apparatus is confronted with the problem of how to carry out the engaging operation of the friction clutch smoothly and this problem has been solved in the conventional apparatus by gradually decreasing the slip rate from the start of the engagement of the clutch. In more detail, the conventional apparatus is adapted to carry out the engaging of the friction clutch in accordance with programmed control for driving the actuator in such a way that the slip rate of the clutch gradually changes from 1 (completely disengaged state) to zero (completely engaged state) at a predetermined changing rate when clutch engagement has been commanded.

Therefore, in the conventional device, the actuator is driven in such manner as to vary the slip rate of the clutch from 1 to zero at a predetermined change rate even when the command for engaging the clutch is given to engage the clutch at a time when the slip rate of the clutch has already become a value less than 1. Consequently, it is decided that the clutch has been operated too far in the direction of engagement at the start of the engagement of the clutch, so that the operation for engaging the clutch is maintained in a waiting condition for a time equal to that normally required for the clutch to reach the degree of engagement at that time. Consequently, an efficient engaging operation of the clutch cannot be carried out because this waiting condition of the engaging operation wastes time which could have been used for control operation and prevents the time taken for engaging the clutch from being shortened.

SUMMARY OF THE INVENTION

It is an object of the present invention to provide an improved apparatus for controlling a friction clutch in which the engaging operation is carried out by controlling the slip rate of the friction clutch.

It is another object of the present invention to provide a friction clutch controlling apparatus which is capable of carrying out efficient engaging operation of the friction clutch without wasteful operation.

A friction clutch controlling apparatus according to the present invention has an actuator which is connected with a friction clutch and operates in response to an electric signal, a first means for sensing the slip rate of the friction clutch, and a second means for driving the actuator in response to a command signal which commands the engagement of the friction clutch so as to gradually carry out the engaging operation of the friction clutch by changing the slip rate of the friction clutch in accordance with predetermined slip rate control characteristics. The apparatus further comprises a detecting means responsive to the command signal and the output of the first means for detecting the slip rate of the friction clutch at the start of the engaging operation of the clutch, and a control means responsive to at least the command signal and the output from the detecting means for controlling the second means so as to start the control of the slip rate for engaging the clutch from the slip rate detected by the detecting means in accordance with the slip rate control characteristics.

The slip rate control characteristics can be set, for example, as the amount of change of the slip rate with the passage of time, and data corresponding to the characteristics can be stored in a memory as map data. When the start of the clutch engaging operation is commanded by the command signal, the slip rate of the friction clutch at this time is detected by the detecting means. The value of the slip rate detected by the detecting means is considered in the controlling means and the operating condition of the actuator instantly assumes a condition matched to the detected slip fate. After this, the slip rate control is started in such a way that the slip rate is decreased from this detected slip rate in accordance with the predetermined control characteristics. As a result, extremely efficient control of the clutch engaging operation can be carried out automatically, without waste of time during the control operation.

The invention will be better understood and other objects and advantages thereof will be more apparent from the following detailed description of preferred embodiments with reference to the accompanying drawings.

DESCRIPTION OF THE PREFERRED EMBODIMENTS

Figure 1:
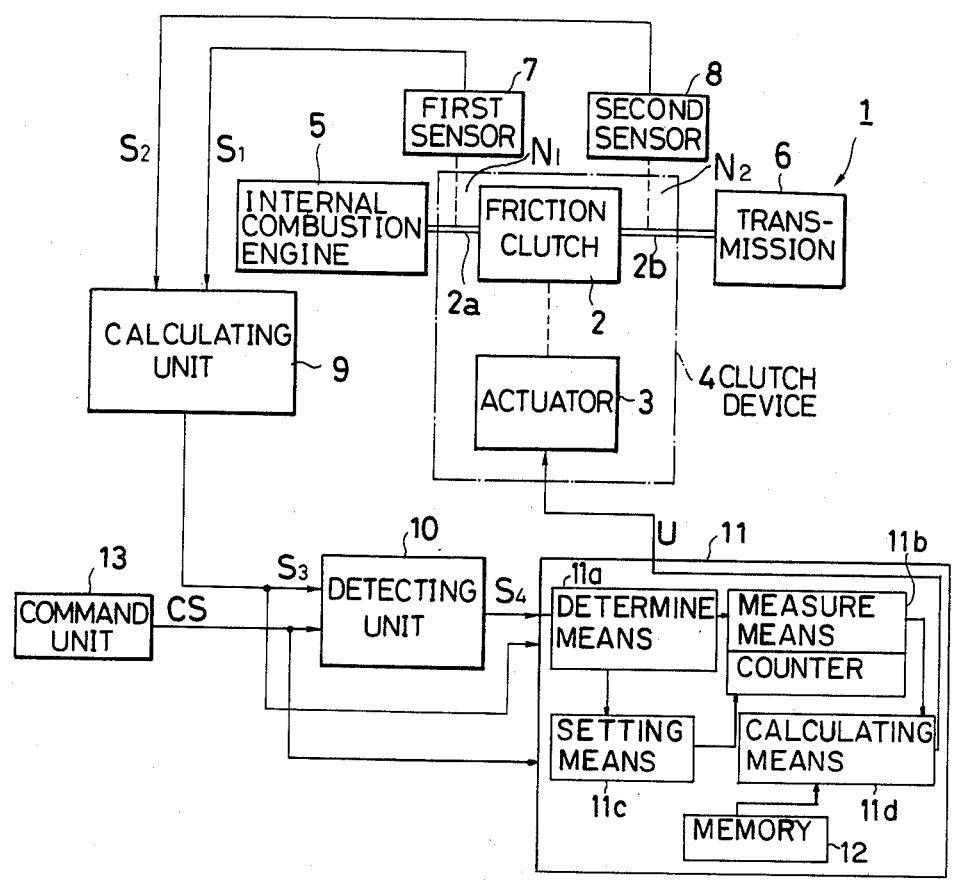
FIG. 1 is a block diagram of an embodiment of the apparatus for controlling a friction clutch according to the present invention.

FIG. 1 is a block diagram showing an embodiment of a friction clutch controlling apparatus according to the present invention. The friction clutch controlling apparatus 1 is for controlling the engaging/disengaging operation of a clutch device 4 which comprises a friction clutch 2 and an actuator 3 connected with the friction clutch 2 in order to perform the engaging/disengaging (ON/OFF) operation of the friction clutch 2 in response to an electric signal. In the embodiment shown in FIG. 1, the clutch device 4 is used for the purpose of transmitting the rotational output power from a vehicle internal combustion engine 5 to a transmission 6. The friction clutch controlling apparatus 1 comprises a first sensor 7 for detecting the input rotational speed $N_1$ at an input shaft $2_a$ of the friction clutch 2 to which the rotational output from the internal combustion engine 5 is input, and a second sensor 8 for detecting the output rotational speed $N_2$ at an output shaft $2_b$ of the friction clutch 2 which is connected to the transmission 6. These first and second sensors 7 and 8 produce first and second signals $S_1$ and $S_2$ showing the input and output rotational speeds $N_1$ and $N_2$, respectively. The first and second signals $S_1$ and $S_2$ are input to a calculating unit 9, wherein the slip rate S of the friction clutch 2 at each instant is calculated on the basis of the input rotational speed $N_1$ shown by the first signal $S_1$ and the output rotational speed $N_2$ shown by the second signal $S_2$ by the following formula.

$$S = \frac{N_1 - N_2}{N_1} \qquad (1)$$

The calculating unit 9 outputs a slip rate signal $S_3$ representing the slip rate S obtained as a result of the above calculation. The slip rate signal $S_3$ is input to a detecting unit 10 to which a command signal CS for commanding the engaging/disengaging operation of the friction clutch 2 is applied from a command unit 13. The detecting unit 10 is provided for the purpose of detecting the slip rate of the friction clutch 2 at the time a command is given by the command signal CS to engage the friction clutch 2, and outputs a detection signal $S_4$ showing the result of the detection. The detection signal $S_4$ is applied to a control unit 11 to which the slip rate signal $S_3$ is applied.

Figure 2:
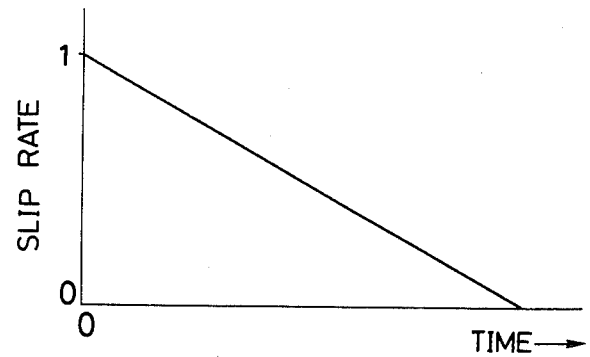
FIG. 2 is a characteristic diagram for explaining the operation of the apparatus for controlling the friction clutch shown in FIG. 1.

The control unit 11 is responsive to the slip rate signal $S_3$, the detection signal $S_4$ and the command signal CS and produces a control signal U for controlling the engaging/disengaging operation of the friction clutch 2 according to a slip rate controlling method in which the actuator 3 is driven in accordance with the control signal U. Control data corresponding to the characteristic curve shown in FIG. 2 is stored in a memory 12 within the control unit 11. The control data shows the relationship between the lapse of time after the start of the clutch engaging operation and the slip rate at that time in the case where the slip rate is changed from a one state, otherwise designated as "1", to a zero state, otherwise designated as "0", for engaging the friction clutch 2.

Whithin control unit 11 there is a determining means 11a responsive to the output of detecting unit 10 for determining the lapse of time corresponding to the slip rate, which is detected by detecting unit 10 in accordance with the slip rate control characteristics. Control unit 11 also has a measuring means 11b for measuring the lapse of time after the start of the engaging operation of friction clutch 2, a setting means 11c for setting the initial value of measuring means 11b in accordance with the output of determining means 11a, and a calculating means 11d for calculating the slip rate corresponding to the result of the measurement of measuring means 11b with respect to the slip rate control characteristics. The slip rate thus output from calculating means 11d is then provided as a target slip rate to actuator 3.

When the clutch engaging operation is commanded by the command signal CS, the slip rate of the friction clutch 2 at this time is represented by the detection signal $S_4$, and the driving operation of the actuator 3 is carried out in accordance with the control signal U in such a way that the slip rate represented by the slip rate signal $S_3$ decreases from the slip rate indicated by the detection signal $S_4$ at this time to zero (a completely engaged condition) in accordance with the degree of inclination as shown in the characteristic curve in FIG. 2. On the other hand, when a command has been given by the command signal CS to disengage the friction clutch 2, the actuator 3 is driven by the control signal U so as to bring the slip rate of the friction clutch 2 instantly to 1.

According to this construction, when a command is given to engage the friction clutch 2, the slip rate control for engaging the friction clutch 2 starts from the slip rate at that time and proceeds in accordance with a predetermined characteristic curve. Therefore, compared with the conventional apparatus which changes the slip rate from 1 to zero in accordance with the characteristic shown in FIG. 2 regardless of the value of the slip rate at the time when the command for engaging the friction clutch 2 is given, the apparatus according to the present invention is superior in that no time is wasted for the engaging operation of the friction clutch 2, resulting in a highly efficient engaging operation of the clutch.

Figure 3:
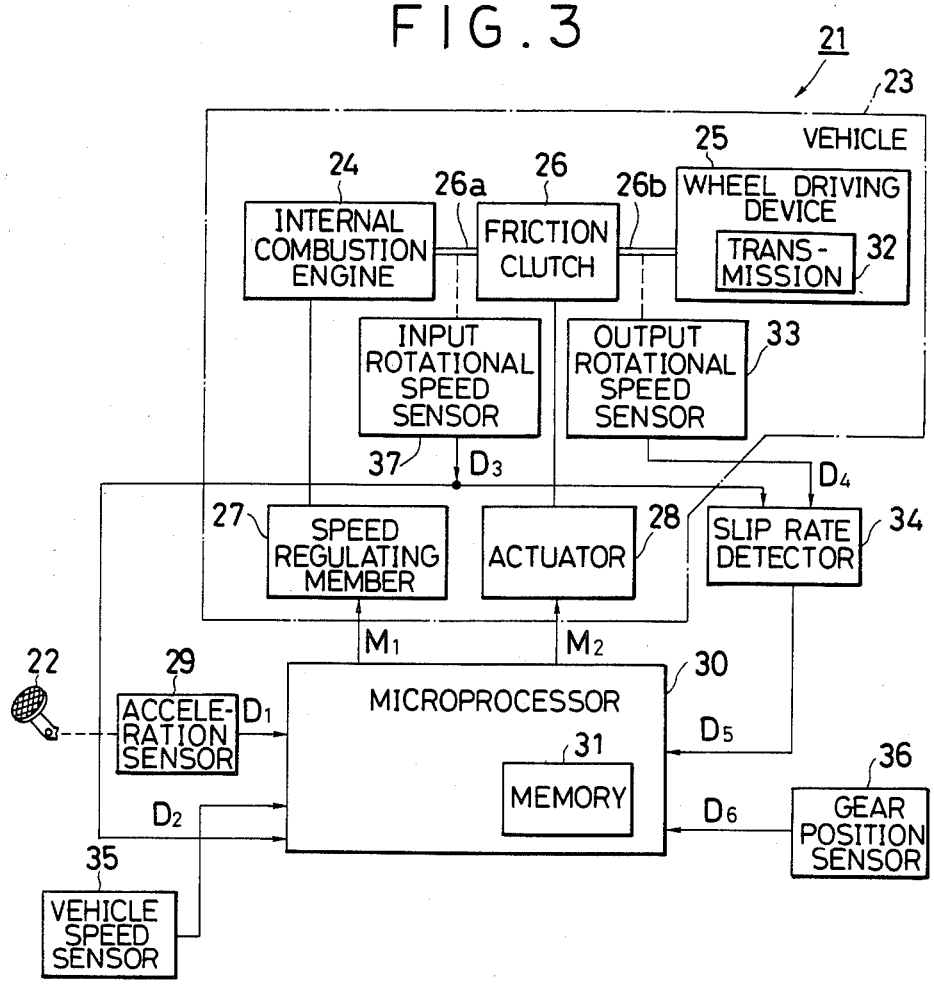
FIG. 3 is a block diagram of another embodiment showing a control apparatus for starting the operation of a vehicle employing an apparatus for controlling a friction clutch according to the present invention.

FIG. 3 is a block diagram showing another embodiment of a friction clutch controlling apparatus according to the present invention, which is applied to a starting control apparatus for automatically starting a vehicle powered by an internal combustion engine. The starting control apparatus 21 is for automatically carrying out the operation for starting a vehicle 23 powered by an internal combustion engine 24 in response to the operation of the depression of an accelerator pedal 22. The vehicle 23 has a friction clutch 26 which is located between a wheel driving device 25 including a transmission 32 and the internal combustion engine 24. The vehicle 23 has a speed regulating member 27 which is coupled with the internal combustion engine 24 for regulating the speed of the internal combustion engine 24 and an actuator 28 which is coupled with the friction clutch 26 for actuating the friction clutch 26.

An input rotational speed sensor 37 is coupled with an input shaft $26_a$ of the friction clutch 26 and produces first speed data $D_3$ showing the rotational speed at the input shaft $26a$. On the output side of the friction clutch 26, there is provided an output rotational speed sensor 33 which is coupled with an output shaft $26b$ of the friction clutch 26 and second speed data $D_4$ showing the rotational speed at the output shaft $26b$ is produced therefrom. The first and second speed data $D_3$ and $D_4$ are applied to a slip rate detector 34, in which the slip rate of the friction clutch 26 is calculated in response to the data $D_3$ and $D_4$. The slip rate detector 34 produces slip rate data $D_5$ showing the slip rate of the friction clutch 26 at each instant.

A control program for controlling the starting of the vehicle 23 in response to the amount of depression of an accelerator pedal 22 is stored in a memory 31 within a microprocessor 30 to which acceleration data $D_1$ representing the amount of depression of the accelerator pedal 22 is input from an acceleration sensor 29 coupled with the accelerator pedal 22. In the microprocessor 30, a control calculation for starting the vehicle 23 is executed according to the control program stored in the memory 31 in response to the acceleration data $D_1$, vehicle speed data $D_2$ representing the vehicle speed V produced from a vehicle speed sensor 35, the first speed data $D_3$, the slip rate data $D_5$ and gear position data $D_6$ which is produced by a gear position sensor 36 and represents the gear position of the transmission 32 at each instant.

This control calculation includes a speed control calculation for controlling the rotational speed of the internal combustion engine 24 and a clutch control calculation for controlling the engaging/disengaging operation of the friction clutch 26. First and second control signals $M_1$ and $M_2$, which are obtained on the basis of the result of the control calculations, are output from the microprocessor 30 and applied to the speed regulating member 27 and the actuator 28, respectively. The starting operation of the vehicle 23 is carried out automatically as a result of the engine speed control and the control of the slip rate of the friction clutch 26 being carried out in accordance with the first and second control signals $M_1$ and $M_2$, respectively.

Figure 4:
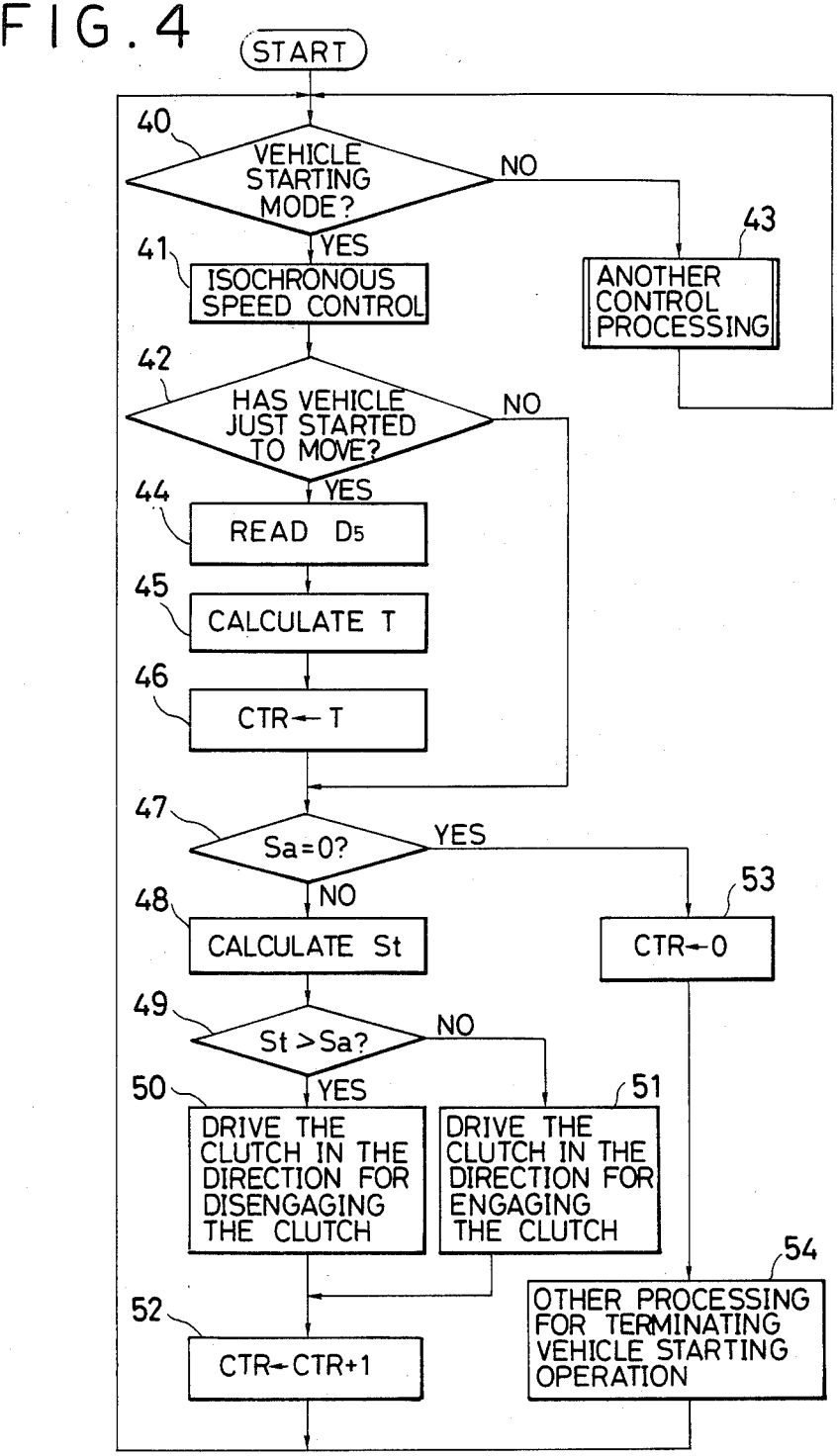
FIG. 4 is a flowchart showing a control program executed in the microcomputer in the apparatus shown in FIG. 3.

FIG. 4 is a flowchart showing a control program for execution in the microprocessor 30 shown in FIG. 3. A description of the flowchart will be given in the following. After the start of the execution of the program, the operation moves to step 40, wherein, based on first speed data $D_3$, the vehicle speed data $D_2$, the acceleration data $D_1$, the slip rate data $D_5$, and the gear position data $D_6$, a discrimination is made as to whether the vehicle 23 is in a starting mode. If the result of the discrimination in step 40 is that the vehicle is in the starting mode, the operation moves to step 41 wherein the speed control mode of the engine 24 is set to an isochronous speed control mode. Then, the operation moves to step 42 wherein it is discriminated whether the vehicle 23 has just started to move. If the result of the decision in step 40 is NO, the procedure moves to step 43 wherein speed control other than control of the starting operation is carried out.

Figure 5:
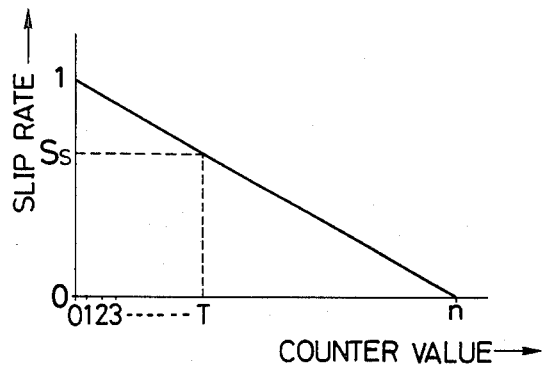
FIG. 5 is a characteristic diagram for explaining the clutch engaging operation in the apparatus shown in FIG. 3.

When it is discriminated in step 42 that the vehicle has just started to move, the decision in step 42 becomes YES and the operation moves to step 44 in which the slip rate data $D_5$ is read and the slip rate $S_s$ at the time the vehicle has just started to move is detected. In order to gradually engage the friction clutch 26 by the slip rate control, the data representing predetermined characteristics of the clutch engagement shown in FIG. 5 is stored as map data in memory 31. The predetermined characteristics are determined in such a way that the slip rate of the clutch 26 decreases at a predetermined rate along with the increase in the count value of a counter CTR in the microprocessor 30. Counter CTR, in this instance, may be equated with the heretofore discussed measuring means related to the FIG. 1 embodiment. In this control system, the control program is basically constructed so as to start the counting operation of the counter CTR at the same time as the operation for engaging the clutch starts and to calculate the target slip rate $S_t$ at each instant from the map data on the basis of the result of the counting of the counter CTR. The operation then moves to step 45 wherein the map calculation for obtaining the count value T of the counter CTR corresponding to the slip rate $S_s$ is carried out (refer to FIG. 5) on the basis of the slip rate $S_s$ obtained in step 44 in accordance with the map data. After this, the procedure moves to step 46 in which the value T obtained in step 45 is set as the initial value of the counter CTR. As can be understood from the above description, the value of the counter CTR is set at zero in the case where the slip rate is 1 at the time the vehicle is started.

After this, the operation moves to step 47 wherein it is discriminated whether the actual slip rate $S_a$ at that time is zero or not, on the basis of the slip rate data $D_5$. If the result of the discrimination in step 47 is NO, that is, if the friction clutch 26 has not yet been fully engaged, the operation proceeds to step 48 wherein the target slip rate $S_t$ at that time is found as mentioned above from the value of the counter CTR at that time by a map calculation. The operation then moves to step 49 in which it is discriminated whether $S_t$ is greater than $S_a$.

When the actual slip rate at that time is less than the predetermined slip rate, or $S_t > S_a$, the procedure moves to step 50 wherein the friction clutch 26 is driven by the actuator 28 in the direction for disengaging the clutch 26. On the other hand, if the actual slip rate at that time is equal to or greater than the predetermined slip rate, $S_a$ becomes equal to or more than $S_t$ and the procedure moves to step 51 in which the friction clutch 26 is driven by the actuator 28 in the direction for engaging the friction clutch 26. After either step 50 or 51 have been carried out, the procedure moves to step 52 wherein the value of the counter CTR is increased by only 1, and the procedure moves back to step 40.

When the discrimination result in step 40 is still YES, the procedure moves through step 41 to step 42 wherein it is discriminated whether the vehicle has just started to move or not. In this case, the result of the discrimination in step 42 becomes NO since the procedure is already in the course of the starting operation. Consequently, the executions of step 44 through 46 are omitted and the steps from 47 onwards are repetitively carried out as mentioned above.

The result of the discrimination in step 47 becomes YES when $S_a$ becomes zero, that is, when the friction clutch 26 assumes a completely engaged condition. The procedure then moves to step 53 wherein the counter CTR is reset and then to step 54 wherein other processings for terminating the vehicle starting operations are carried out, and the operation reverts back to step 40.

According to this arrangement, the slip rate $S_s$ at the time the vehicle has just started is detected before beginning the engaging operation of the clutch for starting the vehicle. The actuator 28 is controlled in such a way that the clutch engaging operation for the starting operation is begun from this slip rate $S_s$ being detected and the slip rate is reduced from this slip rate $S_s$ to zero in accordance with the predetermined characteristics shown in FIG. 5. As a result, the amount of time wasted during the control operation is reduced and the starting operation can be carried out automatically with high efficiency. Furthermore, since the slip rate of the clutch begins to decrease immediately even when the slip rate of the clutch at the beginning of the starting operation is less than 1, the starting operation can be carried out smoothly.

I claim:

1. A friction clutch controlling apparatus having an actuator which is connected with a friction clutch and operates in response to an electric signal, means for sensing the slip rate of the friction clutch, and means for driving the actuator in response to a command signal which commands the engagement of the friction clutch so as to gradually carry out the engaging operation of the friction clutch by changing the slip rate of the friction clutch in accordance with predetermined slip rate control characteristics, said apparatus comprising:

detecting means responsive to the command signal and the output of said sensing means for detecting the slip rate of the friction clutch at the time of the start of the engaging operation of the clutch; and control means responsive to at least the command signal and the output from said detecting means for controlling said driving means so as to start the control of the slip rate for engaging the clutch from the slip rate detected by said detecting means in accordance with the slip rate control characteristics;

wherein the slip rate control characteristics represent a relationship between the lapse of time after the start of the engaging operation of the friction clutch and the slip rate at an instance where the slip rate is changed from a one state to a zero state for engaging the friction clutch; and wherein said control means has;

(a) determining means responsive to the output from said detecting means for determining the lapse of time corresponding to the slip rate detected by said detecting means in accordance with the slip rate control characteristics;

(b) measuring means for measuring the lapse of time after the start of the engaging operation of the friction clutch;

(c) setting means for setting the initial value of said measuring means in accordance with the output of said determining means; and (d) calculating means for calculating the slip rate corresponding to the result of the measurement of said measuring means in accordance with the slip rate control characteristics so that the slip rate obtained by said calculating means is provided as a target slip rate to said driving means.

2. An apparatus as claimed in claim 1 wherein said measuring comprises a counting means which starts to count in response to the command signal.

3. An apparatus as claimed in claim 2 wherein the initial value of the counting means is set in accordance with the output of said determining means.

4. An apparatus as claimed in claim 1 wherein said actuator controls an actual slip rate in such a way that the actual slip rate coincides with the target slip rate, the actual slip rate varying with the passage of time in accordance with the slip rate control characteristics.

* * * * *

UNITED STATES PATENT AND TRADEMARK OFFICE
CERTIFICATE OF CORRECTION

PATENT NO. : 4,722,429
DATED : February 2, 1988
INVENTOR(S) : Hiromi Kono

It is certified that error appears in the above-identified patent and that said Letters Patent is hereby corrected as shown below:

Column 8, line 14, after "measuring" insert --means--.

Signed and Sealed this

Second Day of August, 1988

Attest:

DONALD J. QUIGG

Attesting Officer

Commissioner of Patents and Trademarks